United States Patent
Reynolds et al.

(10) Patent No.: US 9,183,638 B2
(45) Date of Patent: Nov. 10, 2015

(54) IMAGE BASED POSITION DETERMINATION

(75) Inventors: Carson Reynolds, Tokyo (JP); Emad William Saad, Renton, WA (US); John Lyle Vian, Renton, WA (US); Masatoshi Ishikawa, Chiba-ken (JP)

(73) Assignee: THE BOEING COMPANY, Chicago, IL (US)

( * ) Notice: Subject to any disclaimer, the term of this patent is extended or adjusted under 35 U.S.C. 154(b) by 1070 days.

(21) Appl. No.: 13/206,456

(22) Filed: Aug. 9, 2011

(65) Prior Publication Data

US 2013/0038717 A1 Feb. 14, 2013

(51) Int. Cl.
*G06K 9/32* (2006.01)
*G06T 7/20* (2006.01)

(52) U.S. Cl.
CPC ..... *G06T 7/2033* (2013.01); *G06T 2207/10032* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 4,671,650 A | 6/1987 | Hirzel et al. | |
| 6,711,293 B1 | 3/2004 | Lowe | |
| 6,950,552 B2* | 9/2005 | Nair et al. | 382/195 |
| 7,400,950 B2* | 7/2008 | Reich | 701/3 |
| 7,511,736 B2* | 3/2009 | Benton | 348/208.14 |
| 8,497,905 B2* | 7/2013 | Nixon | 348/143 |
| 2010/0017115 A1* | 1/2010 | Gautama | 701/202 |
| 2010/0193626 A1* | 8/2010 | Goossen et al. | 244/2 |
| 2011/0134249 A1* | 6/2011 | Wood et al. | 348/164 |
| 2013/0038717 A1* | 2/2013 | Reynolds et al. | 348/135 |
| 2014/0098990 A1* | 4/2014 | Vian et al. | 382/103 |

FOREIGN PATENT DOCUMENTS

| | | |
|---|---|---|
| CN | 101762277 A | 6/2010 |
| EP | 2112630A2 A2 | 10/2009 |
| EP | 2246664A1 A1 | 11/2010 |

OTHER PUBLICATIONS

Chatterji et al, Vision-Based Position and Attitude Determination for Aircraft Night Landing, Journal of Guidance, Control, and Dynamics, vol. 21, No. 1, Jan.-Feb. 1998.*
Vian, "Distributed Position Identification," U.S. Appl. No. 13/647,866, filed Oct. 9, 2012, 45 pages.
Little, "Robot Partners: Collaborative Perceptual Robotic Systems," First International Workshop on Cooperative Distributed Vision, Oct. 1997, 24 Pages.
Nister et al., "Visual Odometry," Proceedings of the 2004 IEEE Computer Society Conference on Computer Vision and Pattern Recognition, vol. 1, Jun. 2004, pp. 652-659.
Gore et al., "A Mobile Robot That Learns Its Place," MIT Press Journals, Neural Computation, vol. 9, No. 3, Mar. 1997, pp. 683-699.
Roberti et al., "Hybrid Collaborative Stereo Vision System for Mobile Robots Formation," International Journal of Advanced Robotic Systems, vol. 6, No. 4, Dec. 2009, pp. 257-266.

(Continued)

*Primary Examiner* — Andrae S Allison
(74) *Attorney, Agent, or Firm* — Yee & Associates, P.C.

(57) ABSTRACT

A method and apparatus for identifying a position of a platform. Features are identified in a series of images generated by a camera system associated with the platform while the platform is moving. A shift in a perspective of the camera system is identified from a shift in a position of the features in the series of images. A change in the position of the platform is identified based on the shift in the perspective.

26 Claims, 9 Drawing Sheets

(56) References Cited

OTHER PUBLICATIONS

GB search report dated Jan. 4, 2013 regarding application GB1214296.4, reference P55613GB/RGBH, applicant The Boeing Company, 6 pages.
U.S. Appl. No. 12/814,322, filed Jul. 11, 2010, Vian.
U.S. Appl. No. 12/782,525, filed May 18, 2010, Saad et al.
Neumann, "Natural Feature Tracking for Augmented-Reality", Revised for IEEE Transactions on Multimedia, Nov. 30, 1998, pp. 1-23, Computer Science Department, Integrated Media Systems Center, University of Southern California.
Wagner, "Pose Tracking from Natural Features on Mobile Phones", 7th IEEE/ACM International Symposium Mixed and Augmented Reality, 2008, ISMAR 2008 Cambridge, Sep. 15-18 2008, pp. 125-134.
Omnivision, "OV5642 5-Megapixel Product Brief", pp. 1-2, Retrieved on Jun. 21, 2011 http://www.ovt.com/products/sensor.php?id=65.

* cited by examiner

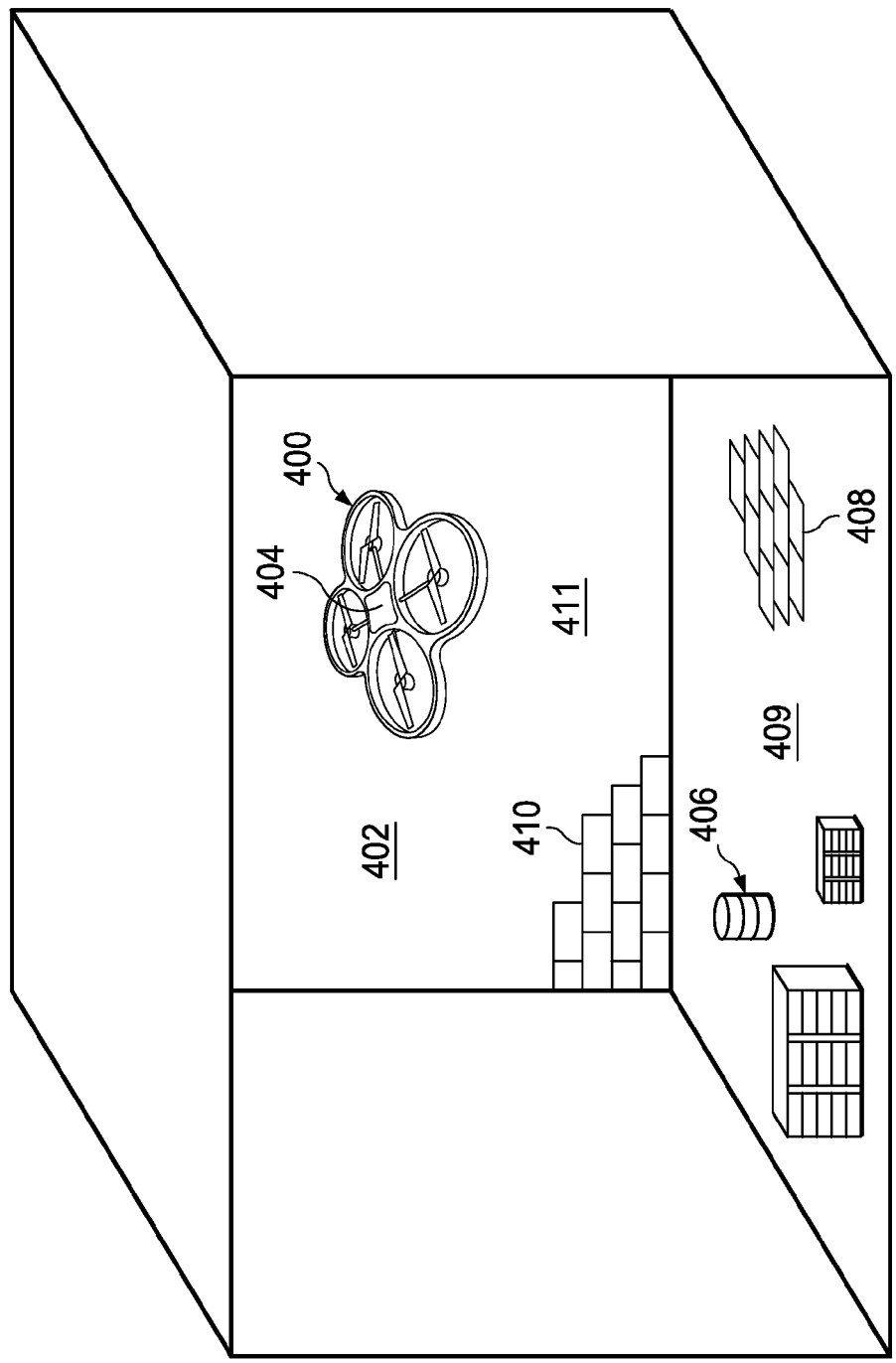

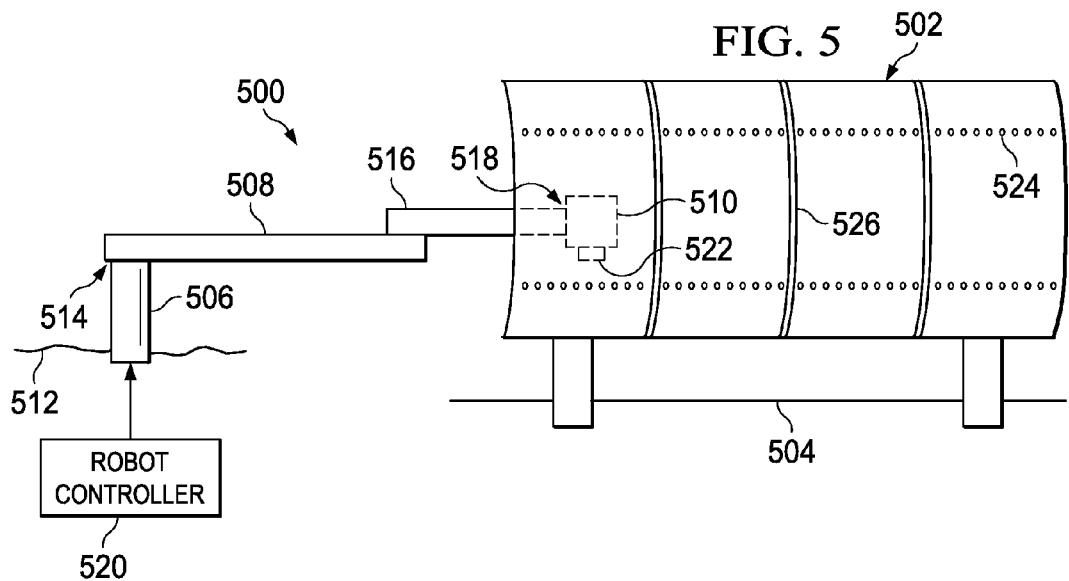
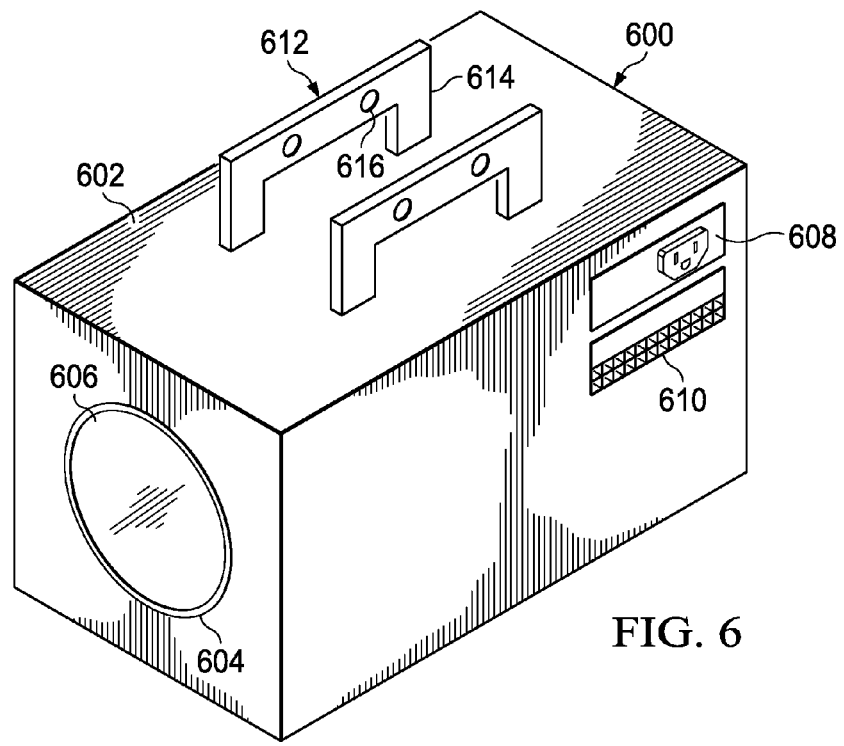

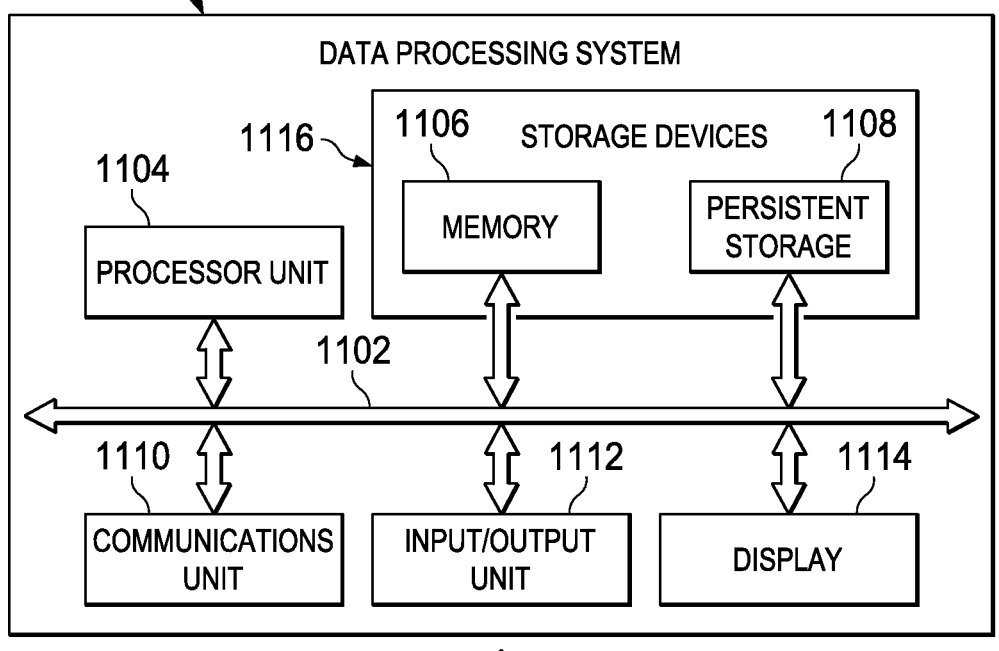
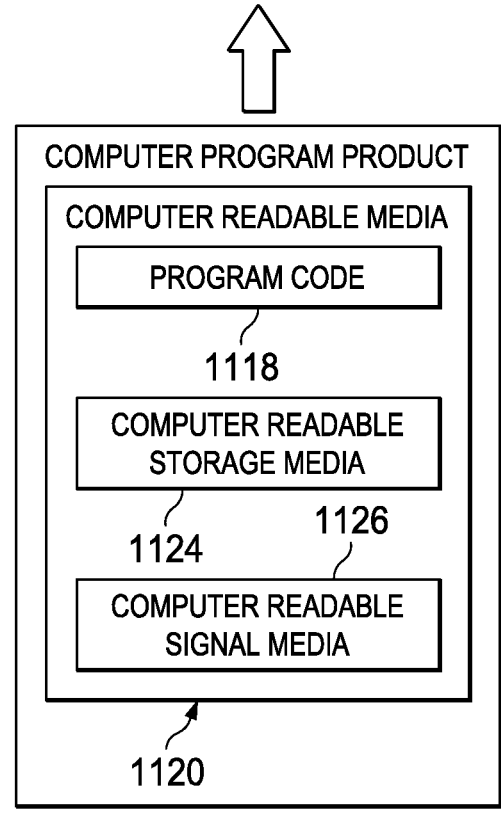
FIG. 11

IMAGE BASED POSITION DETERMINATION

BACKGROUND INFORMATION

1. Field

The present disclosure relates generally to identifying the location and orientation of an object and, in particular, to identifying the position of a moving object. Still more particularly, the present disclosure relates to a method and apparatus for identifying the position of a moving object using images generated by the object.

2. Background

The position of an aircraft at any point in time may be defined in terms of the location of the aircraft in three-dimensional space, the orientation of the aircraft, or both the location and orientation of the aircraft. For example, the location of an aircraft may be defined by geographic coordinates and the altitude of the aircraft. The orientation of an aircraft may be defined in terms of an angle of the aircraft in relation to a given line or plane, such as the horizon. The orientation of the aircraft may be referred to as the attitude. The attitude of an aircraft may be described with reference to three degrees of freedom, referred to as roll, pitch, and yaw.

Various complex systems are employed by an aircraft to determine a current position of the aircraft. For example, the current location of an aircraft may be determined using a global positioning system (GPS). In this case, global positioning system hardware on the aircraft includes a receiver to receive signals from a number of satellites. Additional hardware and software on the aircraft determines the current location of the aircraft from the received satellite signals.

Alternatively, a radio navigation system on the aircraft may be used to determine the current location of the aircraft from radio signals received from a number of known locations on the ground. Various hardware or hardware and software systems also may be used to determine the orientation of the aircraft. For example, electromechanical gyroscope systems may be used to determine attitude of the aircraft at any point in time.

Accurate knowledge of the current position of an aircraft is desirable to effectively control the aircraft to perform a mission. However, current systems and methods for determining a position of an aircraft may affect efficient operation of the aircraft. Furthermore, current systems and methods for determining an aircraft position may not identify a current position of the aircraft as accurately as desired in different situations. For example, global positioning systems (GPS) and radio navigation systems may not be able to determine the position when signals are not available or blocked by features in the operating environment.

Accordingly, it would be advantageous to have a method and apparatus that takes into account one or more of the issues discussed above, as well as possibly other issues.

SUMMARY

An advantageous embodiment of the present disclosure provides a method for identifying the position of a platform. Features in a series of images generated by a camera system associated with the platform while the platform is moving are identified. A shift in the perspective of the camera system is identified from a shift in a position of the features in the series of images. A change in the position of the platform is identified based on the shift in the perspective.

Another advantageous embodiment of the present disclosure provides a method for identifying a position of an aircraft. Features in a series of images generated by a camera system associated with the aircraft are identified while the aircraft is moving. A shift in a perspective of the camera system is identified from a shift in a position of the features in the series of images. A change in a position of the aircraft is identified based on the shift in the perspective.

Another advantageous embodiment of the present disclosure provides an apparatus including a camera system and a position calculator. The camera system is configured to generate a series of images. The position calculator is configured to identify features in the series of images generated by the camera system while the camera system is moving, to identify a shift in a perspective of the camera system from a shift in a position of the features in the series of images, and to identify a change in a position of the camera system based on the shift in the perspective.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 4 is an illustration of an aircraft operating in an enclosed environment in accordance with an advantageous embodiment;

FIG. 5 is an illustration of a robotic manipulator in accordance with an advantageous embodiment;

FIG. 6 is an illustration of a position identifier in accordance with an advantageous embodiment;

FIG. 11 is an illustration of a data processing system in accordance with an advantageous embodiment.

DETAILED DESCRIPTION

Figure 1:
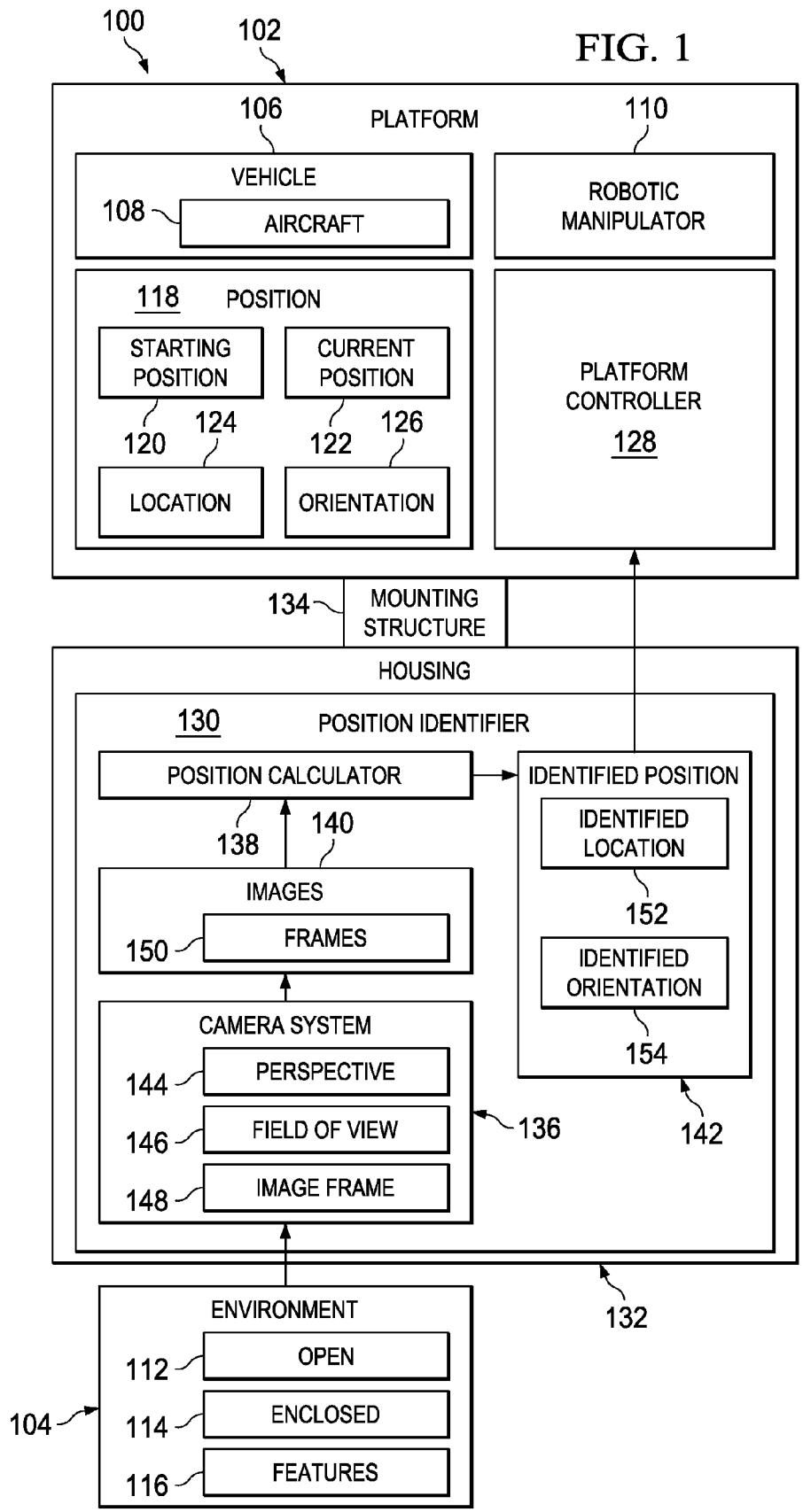
FIG. 1 is an illustration of a block diagram of a position identification environment in accordance with an advantageous embodiment.

The different advantageous embodiments recognize and take into account a number of different considerations. "A number", as used herein with reference to items, means one or more items. For example, "a number of different considerations" are one or more different considerations.

The different advantageous embodiments recognize and take into account that current systems and methods for determining the current position of an aircraft employ hardware that may add significantly to the weight of the aircraft. This additional weight may reduce the efficient and effective operation of the aircraft. For example, increased aircraft weight results in an increased rate of fuel consumption and reduced time on station to complete a mission. Furthermore, the power, wiring, and communications links requirements of current systems and methods for determining an aircraft position are intrusive and may affect the operation or design of other aircraft systems in undesired ways.

The different advantageous embodiments also recognize and take into account that current systems and methods for determining the current position of an aircraft may not be available in many situations. For example, global positioning system and radio navigation system signals may be denied in some areas. Such signals may not penetrate into an enclosed area in which an aircraft is operating or may be jammed or subject to other interference.

One or more of the advantageous embodiments provide a system and method for identifying the position of an aircraft that may be implemented more efficiently than current systems and that may identify the position of the aircraft more accurately and with greater reliability. In accordance with an advantageous embodiment, the position of an aircraft is determined based on a series of images generated by a camera system on the aircraft. The series of images includes features in the environment in which the aircraft is moving. These features are identified in the series of images. A shift in the perspective of the camera system is identified from the shift in the positions of the features in the series of images. A change in the position of the aircraft is identified from the shift in the perspective of the camera system. The current position of the aircraft may be identified based on the change in the position of the aircraft and a starting position of the aircraft.

One or more of the advantageous embodiments may provide a system and method for accurately determining the current position of any moving platform. In accordance with an advantageous embodiment, a camera system and position calculator may be packaged together in a housing to provide a position identifier apparatus. The position identifier may be mounted on any platform to identify the position of the platform while the platform is moving. For example, the position identifier may be attached to a robotic manipulator to identify the position of the robotic manipulator while it is being controlled to perform a task.

Turning to FIG. 1, a block diagram of a position identification environment is depicted in accordance with an advantageous embodiment. Position identification environment 100 includes a moveable platform 102. Platform 102 moves through environment 104. For example, platform 102 may move through environment 104 to perform a task or mission within environment 104. As another example, platform 102 may move through environment 104 as platform 102 moves from one location to another location.

In one illustrative example, platform 102 may be vehicle 106. Vehicle 106 may be, for example, aircraft 108 or some other type of vehicle. Aircraft 108 may be, for example, without limitation, a fixed-wing aircraft, a rotary-wing aircraft, a lighter-than-air vehicle, or some other suitable type of aircraft. Aircraft 108 may be manned or unmanned. Aircraft 108 may include any aerospace vehicle that may operate in the air, in space, or in both the air and space.

As another example, platform 102 may be robotic manipulator 110. For example, without limitation, robotic manipulator 110 may include an industrial robot or other robot that may be used for the manufacture, assembly, inspection, testing of products, or for any combination of these or other functions. As another example, robotic manipulator 110 may include a robot that is used for scientific purposes, such as deep sea or planetary exploration, or for operation in any other environment. As yet another example, robotic manipulator 110 may include a robot that is used for military or crime prevention applications.

Different types of moving platforms may operate in different environments. For example, aircraft 108 may operate in environment 104 that is open 112 or enclosed 114. Environment 104 that is enclosed 114 may include, for example, without limitation, a building or other man-made structure, a cave or other naturally occurring structure, or any other natural or man-made area that is fully or partially enclosed.

Environment 104 is characterized by a number of features 116. Features 116 include features that may be visible to a camera operating at any wavelength. Features 116 may include man-made objects, naturally occurring objects, structures, patterns, or other suitable types of features in environment 104. The positions of features 116 in environment 104 may be known or unknown.

Global positioning system and radio navigation system signals may not be reliably available in environment 104 that is enclosed 114. In other words, these signals may not always be available for use by platform 102 in environment 104 that is enclosed 114. Furthermore, global positioning systems may not be available in environment 104 that is open 112 due to clouds, buildings along the line-of-sight with the satellite, jamming signals, or for other reasons. As a result, determining the position of aircraft 108 with a desired accuracy may not always be possible using these types of signals in environment 104. However, accurate determination of the position of aircraft 108 in any environment and under various conditions is desirable.

At any time, platform 102 is in position 118 in environment 104. For example, as platform 102 moves through environment 104, platform 102 may move from starting position 120 to current position 122. Starting position 120 may be a known position 118 of platform 102. Starting position 120 may be determined using systems and methods for identifying position 118 of platform 102 other than the systems and methods described herein.

Position 118 may include location 124 of platform 102, orientation 126 of platform 102, or both location 124 and orientation 126 of platform 102 in these illustrative examples. Location 124 comprises the point or points in three-dimensional space at which platform 102 is located. Location 124 may be defined with reference to any three-dimensional coordinate system. For example, location 124 of aircraft 108 may be defined by geographic coordinates and an altitude of the aircraft.

Orientation 126 is the angle of platform 102 in relation to a given line or plane in three-dimensional space. Orientation 126 may be described with reference to three degrees of freedom, referred to as roll, pitch, and yaw. In these illustrative examples, orientation 126 of aircraft 108 in environment 104 may be referred to as the attitude of aircraft 108.

Platform 102 includes platform controller 128. Platform controller 128 may control the movement of platform 102 through environment 104 to perform a desired task or mission. Platform controller 128 may comprise an automated controller, a human operator, or a human operator in combination with a machine.

Platform controller 128 may be implemented entirely on platform 102 or may be implemented, at least in part, remotely from platform 102. In the latter case, platform controller 128 may be in wireless communication with platform 102 to control the movement of platform 102. In any case, in order to control the movement of platform 102 to perform a task or mission successfully, it is desirable that position 118 of platform 102 be identified accurately and reliably.

In accordance with an advantageous embodiment, position 118 of platform 102 in environment 104 may be determined accurately and reliably using position identifier 130 associated with platform 102. The components of position identifier 130 may be contained in housing 132. Position identifier 130 may be permanently or removeably attached to platform 102 in these illustrative examples.

For example, position identifier 130 may be attached to platform 102 using mounting structure 134. Mounting structure 134 may include a number of structures on platform 102, a number of cooperating structures on housing 132, and a number of fasteners. The implementation of mounting structure 134 will depend on the implementation of housing 132 and the nature of platform 102 to which position identifier 130 is to be attached.

Position identifier 130 comprises camera system 136 and position calculator 138. Camera system 136 generates images 140 of environment 104 in which platform 102 is moving. Images 140 are provided from camera system 136 to position calculator 138. Position calculator 138 identifies identified position 142 of platform 102 from images 140.

Camera system 136 may comprise a single camera. In other advantageous embodiments, camera system 136 may comprise multiple cameras. The use of a multi-camera system may improve the accuracy of the position determination by position identifier 130.

Camera system 136 may comprise a digital or other video camera operating at any desired wavelength. For example, without limitation, camera system 136 may generate images 140 of environment 104 at visible or infrared wavelengths or at multiple different wavelengths or bands of wavelengths. Camera system 136 may comprise a high speed camera. For example, without limitation, camera system 136 may operate at a frame rate of approximately 100 frames per second or at a higher frame rate. By using a high speed camera, the change between frames is small, and more common feature points are found in consecutive frames. In addition, consecutive frames change by only a small number of pixels. Therefore, a lower resolution camera may be used. Using a lower resolution camera reduces the computational power needed for image processing. Alternatively, camera system 136 may operate at any frame rate.

In one embodiment, the wavelength, frame rate, or both the wavelength and frame rate at which camera system 136 is operated may be variable. In this case, for example, the wavelength, frame rate, or both, may be adjusted based on the particular task or mission of platform 102 or the conditions of environment 104 in which platform 102 is moving.

At any point in time, camera system 136 has a specific perspective 144. Perspective 144 is the appearance of features 116 to camera system 136 as determined by the relative distances and positions of features 116 relative to camera system 136. Further, at any point in time, camera system 136 has a specific field of view 146. Field of view 146 is the portion of environment 104 that appears in images 140 generated by camera system 136. As platform 102 moves through environment 104, perspective 144 and field of view 146 of camera system 136 change.

Locations of points in images 140 generated by camera system 136 may be defined with reference to image frame 148. Image frame 148 is a two-dimensional area containing images 140 generated by camera system 136. As platform 102 moves through environment 104, a series of changing images 140 of environment 104 are generated in image frame 148. The series of changing images 140 reflect the changing perspective 144 and field of view 146 of camera system 136 as platform 102 moves through environment 104.

The series of images 140 generated by camera system 136 are provided to position calculator 138. Individual images in the series of images 140 may be referred to as frames 150. Position calculator 138 may identify current position 122 of platform 102 as identified position 142. Identified position 142 may include identified location 152 and identified orientation 154 of platform 102 for up to six degrees of freedom. Identified position 142 may be provided to platform controller 128 to provide for accurate control of the movement of platform 102.

Position calculator 138 may be implemented in hardware or in hardware and software operating together. Position calculator 138 may be implemented using any hardware or combination of hardware and software that may identify identified position 142 from images 140 with sufficient speed to provide for control of the movement of platform 102 by platform controller 128.

Figure 2:
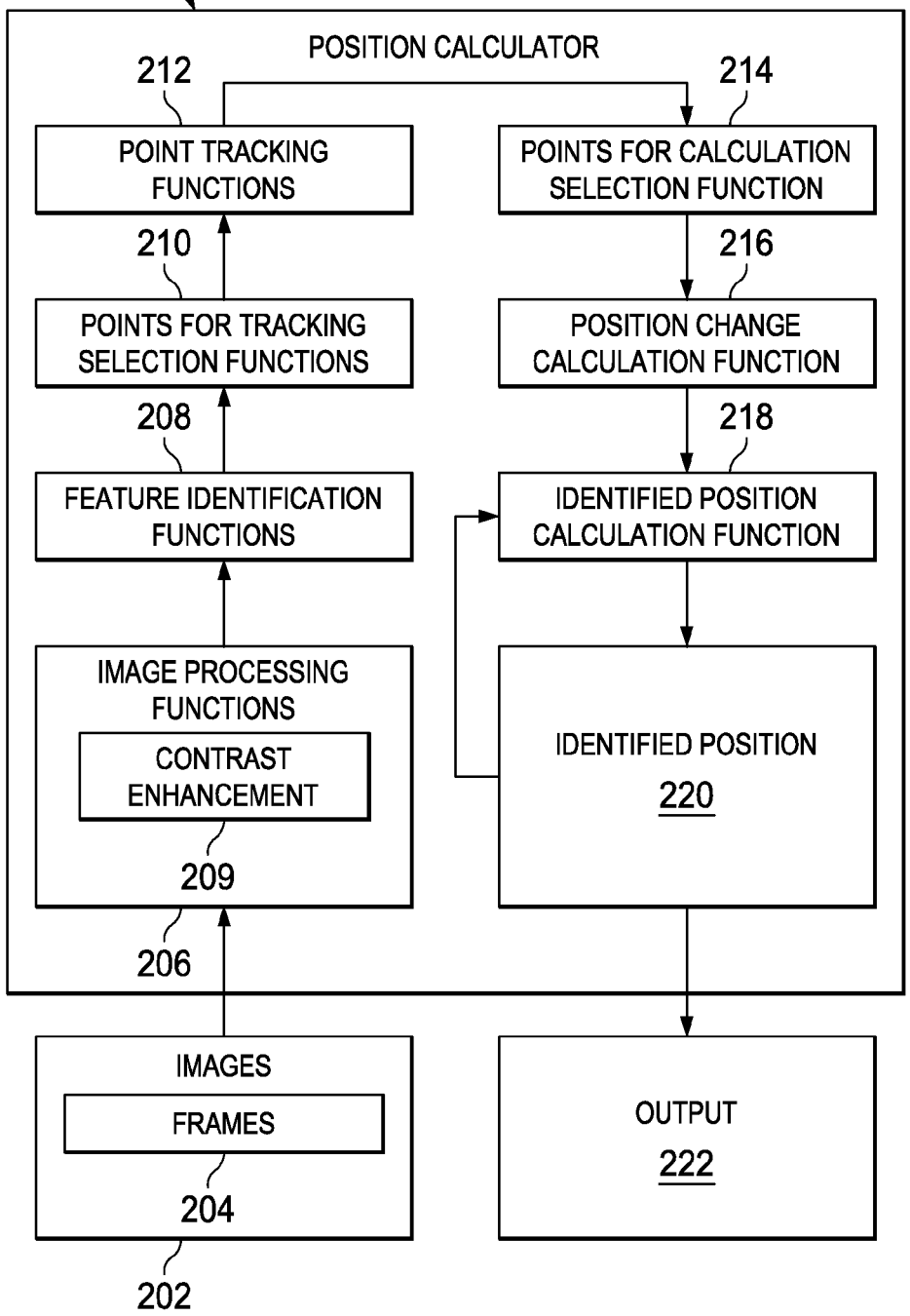
FIG. 2 in an illustration of a block diagram of a position calculator in accordance with an advantageous embodiment.

Turning to FIG. 2, a block diagram of a position calculator is depicted in accordance with an advantageous embodiment. In this example, position calculator 200 is an example of one implementation of position calculator 138 in FIG. 1. Position calculator 200 receives a series of images 202 as input. For example, images 202 may comprise a series of frames 204 of digital images or other images generated by a camera system associated with a moving platform.

In accordance with an advantageous embodiment, position calculator 200 comprises a number of functions for identifying a current position of the platform using images 202. Images 202 received by position calculator 200 first may be processed by image processing functions 206. Image processing functions 206 may include any functions for preparing images 202 for use by the other functions of position calculator 200 described below.

For example, without limitation, image processing functions 206 may include contrast enhancement 209. Contrast enhancement 209 may include known techniques for enhancing contrast in a digital or other image. Contrast enhancement 209 may increase the speed and accuracy with which features may be identified in images 202. For example, thresholds may be applied to images 202 to yield higher contrast analogs.

Feature identification functions 208 identify features in images 202. For example, feature identification functions 208 may identify features in images 202 as processed by image processing functions 206. Any known techniques may be used by feature identification functions 208 to identify features in images 202. For example, without limitation, feature identification functions 208 may identify features in images 202 using scale-invariant feature transforms (SIFT), corner detection, speeded up robust features (SURF), or other techniques either alone or in any combination.

Feature identification functions 208 may assign a single point location to each feature identified in images 202. For example, feature identification functions 208 may assign a single pixel location in the image frame to each feature identified.

Points for tracking selection functions 210 select point locations of features identified by feature identification functions 208 for tracking from frame to frame in the series of images 202. Many features may be identified by feature identification functions 208. Tracking all of the features identified by feature identification functions 208 may slow down processing unnecessarily or otherwise might require unnecessarily fast or additional hardware. Points for tracking selection functions 210, thus, may select a subset of points identified by feature identification functions 208 for tracking.

The number of points for tracking selected by points for tracking selection functions 210 may be fixed or variable. For example, the number of points selected for tracking by points for tracking selection functions 210 may be variable based on the operating conditions of the platform for which a current position is being determined by position calculator 200, the environment in which the platform is operating, or other suitable factors either alone or in any combination.

If the platform is moving quickly through an environment, features identified by feature identification functions 208 may move more quickly out of images 202. In this case, a larger number of points may be selected for tracking by points for tracking selection functions 210.

Further, in certain operating environments, the reliability with which features can be identified from frame to frame in images 202 may be reduced. In this case, selecting a larger number of points for tracking by points for tracking selection functions 210 also may be desired.

Points for tracking selection functions 210 may select individual points for tracking based on various factors. For example, points for tracking selection functions 210 may select for tracking those points that are currently being used by position calculator 200 to identify the position of a moving platform. As another example, points for tracking selection functions 210 may select points for tracking based on the position and past movement of features in images 202.

For example, points corresponding to features that are near an edge of an image and that have been moving in the direction of the edge of the image may not be selected for tracking by points for tracking selection functions 210. Features that are moving themselves may not be useful for identifying the current position of a platform in accordance with an advantageous embodiment. Therefore, points for tracking selection functions 210 may identify points associated with moving features in images 202 and may not select such points for tracking.

Point tracking functions 212 track from frame to frame the points selected by points for tracking selection functions 210. Point tracking functions 212 identify points in a current frame that correspond to points for the same features in a prior frame. A change in position of a feature then may be determined as the difference between the locations in the image frame of the corresponding points in the current frame and the prior frame. Known techniques may be used for tracking from frame to frame points corresponding to features in a series of images. For example, without limitation, points may be tracked between frames and outliers removed using random sample consensus (RANSAC).

Points for calculation selection function 214 selects points being tracked by point tracking functions 212 that will be used to perform the calculation to identify the location of the platform. At least three points corresponding to three features in images 202 may be selected by points for calculation selection function 214. At least three points are selected in order to calculate six degrees of freedom at two degrees of freedom per point.

Position change calculation function 216 calculates a change in the position of the platform using the points selected by points for calculation selection function 214. A change in perspective of the camera system generating images 202 is reflected in a shift in the position of features in images 202.

Position change calculation function 216 calculates the changes of the locations of the selected points in the image frame from the prior frame to the current frame. A plurality of locations in the image frame corresponding to features in the current image may be referred to as a plurality of first locations. A plurality of locations in the image frame corresponding to the features in the prior image may be referred to as a plurality of second locations. A geometrical calculation may then be used to identify the shift in the perspective of the camera system from the calculated changes of the locations of the selected points in the image frame between first locations and second locations corresponding to the same features. The shift in the perspective of the camera system may be calculated along six degrees of freedom. For example, without limitation, the shift in the perspective of the camera system may be calculated along the Cartesian X, Y, Z coordinates along with the Euler angles alpha, beta, and gamma.

Since the camera system is mounted on the platform, the shift in the perspective of the camera system may be used to identify the corresponding change in the position of the platform by position change calculation function 216.

For example, without limitation, position change calculation function 216 may first measure the shift in two dimensions in the image frame of the pixel locations corresponding to the selected features. The measured shifts in pixel locations in the image frame are then converted to a unit of measure in the real world, such as meters or some other real-world measurement. This conversion is calculated using information obtained from the initial calibration of the camera system and may depend on factors, such as the camera zoom, lens power, and resolution. The change of the position of the camera in the real world may then be calculated using basic geometric equations.

Identified position calculation function 218 calculates the current identified position 220 of the platform. For example, identified position calculation function 218 may calculate the current identified position 220 based on the prior identified position 220 as modified by the change in position of the platform as calculated by position change calculation function 216. Initially, identified position 220 may be a known starting position for the platform.

Identified position 220 may be provided as output 222 by position calculator 200. For example, identified position 220 may be provided as output 222 to a platform controller for controlling movement of the platform.

The illustrations of position identification environment 100 in FIG. 1 and position calculator 200 in FIG. 2 are not meant to imply physical or architectural limitations to the manner in which different advantageous embodiments may be implemented. Other components in addition to, in place of, or both in addition to and in place of the ones illustrated may be used. Some components may be unnecessary in some advantageous embodiments. The blocks are presented to illustrate some functional components. One or more of these blocks may be combined or divided into different blocks when implemented in different advantageous embodiments.

For example, all of the functions performed by position identifier 130 may be performed by an apparatus on or attached to platform 102 in FIG. 1. Alternatively, some of the functions of position identifier 130 for identifying the position of platform 102 may be implemented remotely from platform 102.

For example, camera system 136 may be on platform 102, while the functions performed by position calculator 138 are performed remotely from platform 102. In this case, image data from camera system 136 may be sent from platform 102 to the remotely-located position calculator 138.

Identified position 142 provided by position calculator 138 may then be used at the remote location to control movement of platform 102 remotely from the remote location. Alternatively, identified position 142 provided by position calculator 138 at a remote location may be sent back to platform controller 128 on platform 102.

Figure 3:
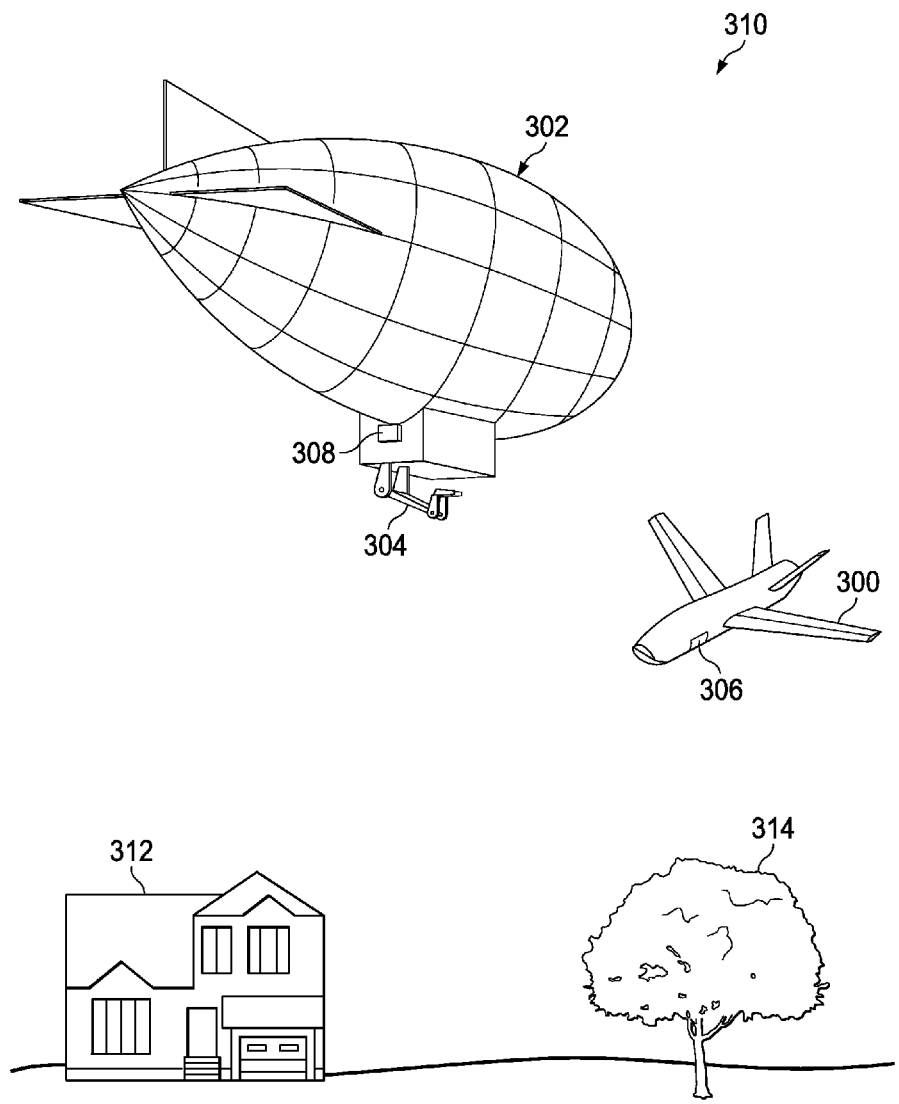
FIG. 3 is an illustration of aircraft operating in an open environment in accordance with an advantageous embodiment.

Turning to FIG. 3, an illustration of aircraft operating in an open environment is depicted in accordance with an advantageous embodiment. In this example, aircraft 300 and aircraft 302 are examples of aircraft 108 in FIG. 1. In this example, aircraft 300 is an unmanned air vehicle. Aircraft 302 is a lighter-than-air vehicle. As depicted, aircraft 300 and aircraft 302 are moving in open environment 310. Open environment 310 is an example of environment 104 that is open 112 in FIG. 1.

Global positioning system signals and radio navigation system signals may not reliably reach into all locations in open environment 310 under all conditions. For example, clouds, buildings, or other obstacles may block the line-of-sight with a global positioning system satellite. As another example, jamming may interfere with signals used for navigation. However, it may be desirable to identify the current position of aircraft 300 and aircraft 302 at any location in open environment 310 and under various conditions in order to control aircraft 300 and aircraft 302 to successfully perform a mission in open environment 310.

In this illustrative example, aircraft 302 operates as a tender for aircraft 300. For example, aircraft 302 may include grasping mechanism 304 for grasping aircraft 300 when aircraft 300 flies near aircraft 302. Aircraft 300 may thus be brought on board aircraft 302 by grasping mechanism 304. On board aircraft 302, aircraft 300 may be refueled, rearmed, repaired, or any other service or number of services may be performed on aircraft 300 as needed or desired. Aircraft 300 may be launched into the air from aircraft 302 with or without use of grasping mechanism 304.

Position identifier 306 may be mounted on aircraft 300. Position identifier 308 may be mounted on aircraft 302. Position identifiers 306 and 308 may be used to determine the current positions of aircraft 300 and aircraft 302, respectively, from changing positions of features in a series of images of open environment 310 in which aircraft 300 and aircraft 302 are moving. The series of images of open environment 310 may be generated using camera systems, such as camera system 136 in FIG. 1, associated with aircraft 300 and aircraft 302. These camera systems are part of position identifiers 306 and 308.

The series of images of open environment 310 may capture features in open environment 310. These features may include man-made structures or objects, such as building 312. Further, the features may include naturally occurring structures or objects, such as tree 314. In accordance with an advantageous embodiment, the current positions of aircraft 300 and aircraft 302 as identified by position identifiers 306 and 308 may be used to move aircraft 300 and aircraft 302 into close proximity and to orient aircraft 300 relative to aircraft 302 for grasping by grasping mechanism 304.

Turning to FIG. 4, an aircraft operating in an enclosed environment is depicted in accordance with an advantageous embodiment. In this example, aircraft 400 is an example of one implementation of aircraft 108 in FIG. 1. For example, without limitation, aircraft 400 may be an unmanned rotary-wing aircraft.

In this depicted example, enclosed environment 402 may be a building or other man-made structure. Alternatively, enclosed environment 402 may be a cave or other naturally occurring enclosed environment. Enclosed environment 402 may be fully or partially enclosed. Enclosed environment 402 is an example of environment 104 that is enclosed 114 in FIG. 1.

Global positioning system signals and radio navigation system signals may not reliably reach into enclosed environment 402. However, it may be desirable to identify the current position of aircraft 400 in enclosed environment 402 in order to control aircraft 400 to successfully perform a mission in enclosed environment 402.

In accordance with an advantageous embodiment, position identifier 404 may be mounted on aircraft 400. Position identifier 404 may be used to determine the current position of aircraft 400 from changing positions of features in a series of images of enclosed environment 402 in which aircraft 400 is moving. As discussed above, the series of images may be generated by a camera system, such as camera system 136 in FIG. 1. The camera system may be associated with aircraft 400 and part of position identifier 404.

Further, features in enclosed environment 402 captured in the series of images may include, for example, without limitation, objects 406 in enclosed environment 402, pattern 408 in floor 409, patterns 410 in wall 411, or other suitable objects or patterns in some other portion of enclosed environment 402 in the field of view of the camera system associated with aircraft 400.

Turning to FIG. 5, a robotic manipulator is depicted in accordance with an advantageous embodiment. In this example, robotic manipulator 500 is an example of one implementation of robotic manipulator 110 in FIG. 1. Robotic manipulator 500 may be an industrial robot or other type of robot that is used to perform an operation on part 502. For example, part 502 may be an aircraft part or any other part, product, or object.

In this illustrative example, part 502 may be mounted on support structure 504. Support structure 504 may be any appropriate structure for supporting part 502, while robotic manipulator 500 is used to perform an operation on part 502. Without limitation, support structure 504 may be fixed or mobile. Furthermore, part 502 may be able to also serve as the support structure.

Robotic manipulator 500 comprises arm support 506, arm 508, and end effector 510. Arm support 506 supports arm 508 on floor 512 or on another fixed or mobile structure on which robotic manipulator 500 may be mounted or otherwise positioned. Arm 508 may be attached to arm support 506 by joint 514 at or near a proximal end of arm 508. Arm 508 may be moveable in a number of directions at joint 514 where arm 508 is attached to arm support 506. Arm 508 may include one or more elbow joints 516. Arm 508 may be moveable in a number of directions at elbow joints 516.

Further, end effector 510 may be attached to arm 508 by joint 518 at or near the distal end of arm 508. End effector 510 may be moveable in a number of directions with respect to arm 508 at joint 518. End effector 510 may comprise a number of tools for performing operations on part 502. For example, without limitation, end effector 510 may include a drill for forming holes in part 502, a welder, a camera or other device for inspecting part 502, or any other tool or combination of tools for performing operations on part 502.

Arm 508 and end effector 510 may be moved in various directions and orientations with respect to part 502 by appropriate actuators at joints 514, 516, and 518. For example, without limitation, such actuators may include electric motors or hydraulic actuators.

Movement of arm 508 and end effector 510 and operation of the tools on end effector 510 may be controlled by robot controller 520. Robot controller 520 may be an automated controller or may include a human operator in combination with a machine.

To successfully control the movement of arm 508 and end effector 510 to perform an operation on part 502, it is desirable to identify accurately the position and orientation of end effector 510 with respect to part 502. In accordance with an advantageous embodiment, end effector 510 may hold position identifier 522. Position identifier 522 may be used to determine the current position of end effector 510 from changing positions of features in a series of images of the environment in which end effector 510 is moving. The series of images may be generated by a camera system associated with end effector 510 and that is part of position identifier 522. Features in the series of images may include various structures or patterns on part 502, such as fasteners 524, joint lines 526, or other structures or patterns on part 502.

Alternatively, such features may include structures or patterns associated with support structure 504 or with any other structure in the field of view of the camera system associated with end effector 510. The current position of end effector 510 as identified by position identifier 522 may be provided to robot controller 520 for use in controlling movement of robot manipulator 500.

Turning to FIG. 6, a position identifier is depicted in accordance with an advantageous embodiment. In this example, position identifier 600 is an example of one implementation of position identifier 130 in FIG. 1. In this example, position identifier 600 is provided as a unit that may be attached to a variety of different platforms to identify the position of a platform in the manner described herein.

Position identifier 600 is not meant to depict an actual position identifier in accordance with an advantageous embodiment. Rather, position identifier 600 depicts a notional position identifier in accordance with an advantageous embodiment. Position identifier 600 is presented to show one possible example of an arrangement of components for a position identifier in accordance with an advantageous embodiment.

Position identifier 600 includes housing 602. Housing 602 contains the various components of position identifier 600 including a camera system and a position calculator as described above. Housing 602 may be designed to protect the other components of position identifier 600 from exposure to various environmental conditions that may be expected in the environment in which position identifier 600 is to be used.

Housing 602 includes aperture 604. The lens of a camera system within housing 602 may be aligned with aperture 604 either directly or via an appropriate intermediate optical system. Aperture 604 may be of any appropriate size and shape. Aperture 604 may be covered with window 606. Window 606 may be made of any material that is appropriate for the environment in which position identifier 600 will be used and that is appropriate for the wavelengths at which the camera system within housing 602 will be operating.

Power connector 608 and at least one data connector 610 may be provided in housing 602. Power connector 608 may include any appropriate connector for providing power to position identifier 600 for operation of the components inside housing 602. Data connector 610 may include any appropriate connector for retrieving data from position identifier 600 or for providing data to position identifier 600 using any appropriate data transmission format and communications protocol.

For example, without limitation, data that may be retrieved from position identifier 600 via data connector 610 may include data that indicates a change in position of a platform or a position of a platform as identified by position identifier 600. For example, without limitation, data that may be provided to position identifier 600 via data connector 610 may include a starting position of a platform. As discussed above, the starting position of the platform may be used by position identifier 600 to identify the current position of the platform.

In another advantageous embodiment, position identifier 600 may be a stand-alone device. In this case, position identifier 600 may be powered by a local power source, such as a battery or other local power source. Data transmission to and from position identifier 600 may be provided using wireless data transmission.

A number of mounting structures 612 may be provided on position identifier 600 for attaching position identifier 600 to a platform. For example, without limitation, mounting structures 612 may include a number of structures 614 that project from housing 602 and a number of mounting apertures 616. Structures 614 and mounting apertures 616 may be used in combination with cooperating structures on the platform and appropriate fasteners to attach position identifier 600 securely to the platform. The implementation of mounting structures 612 for any particular position identifier 600 in accordance with an advantageous embodiment will depend upon the structure of the platform to which position identifier 600 is to be attached.

Figure 7:
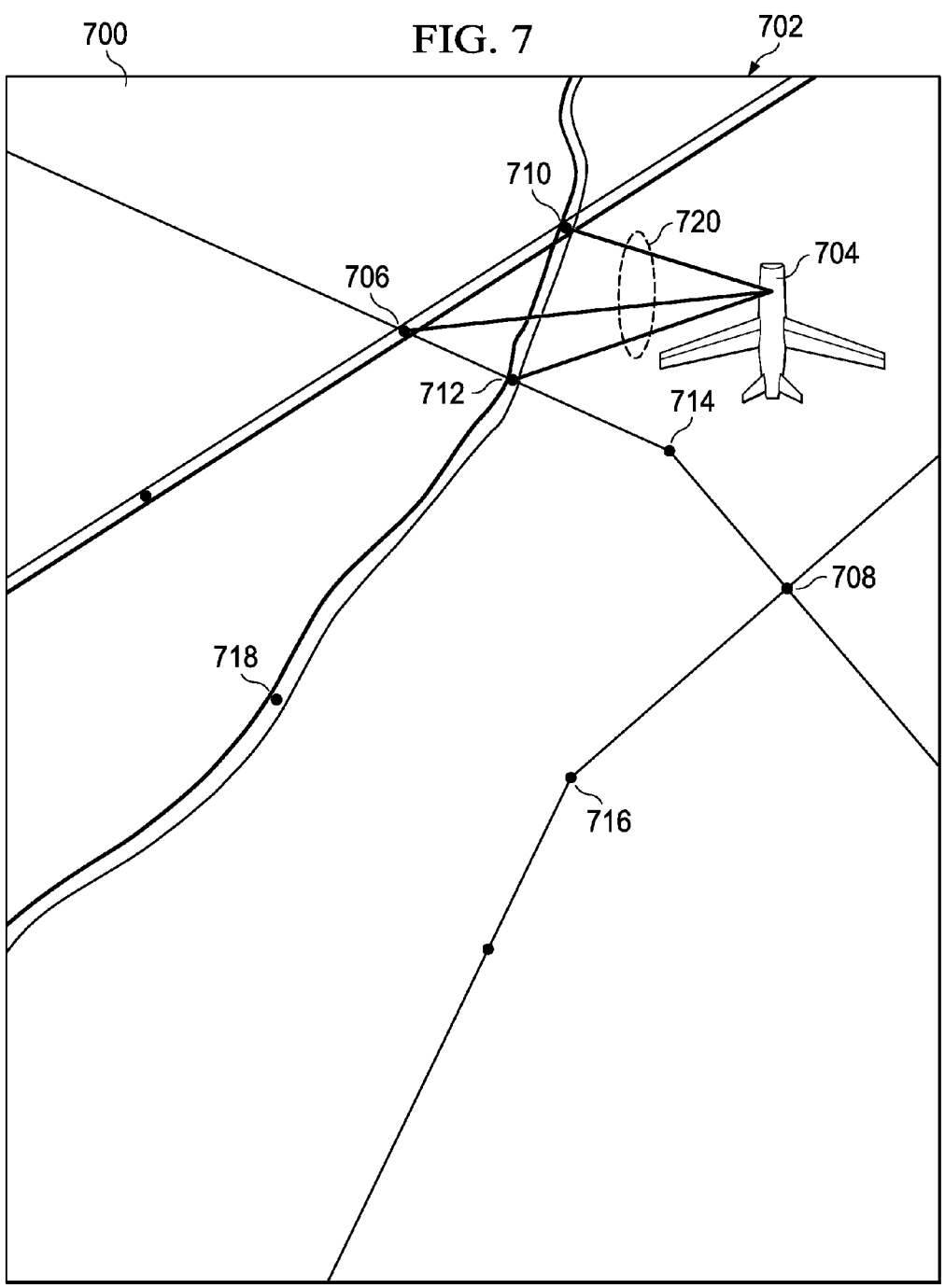
FIG. 7 is an illustration of an image obtained by a camera system on an aircraft in a first position in accordance with an advantageous embodiment.

Turning to FIG. 7, an image generated by a camera system on an aircraft in a first position is depicted in accordance with an advantageous embodiment. In this example, image 700 is an example of images 140 in FIG. 1 or of images 202 in FIG. 2. Positions of features in image 700 may be defined with respect to image frame 702. For example, positions of features in image 700 may be defined with reference to pixel locations in image frame 702.

In this example, image 700 is an image of the ground generated by a camera system on aircraft 704 as aircraft 704 moves above the ground. Features identified in image 700 are identified by point locations in image frame 702. For example, points 706 and 708 correspond to cross road features. Points 710 and 712 correspond to features where roads cross a river. Points 714 and 716 correspond to features where roads change directions. Point 718 corresponds to a feature where the river bends.

Lines 720 are drawn between aircraft 704 and selected points 706, 710, and 712 in image 700. The angles of lines 720 with respect to aircraft 704 reflect and represent the perspective of the camera system on aircraft 704 in the first position.

Figure 8:
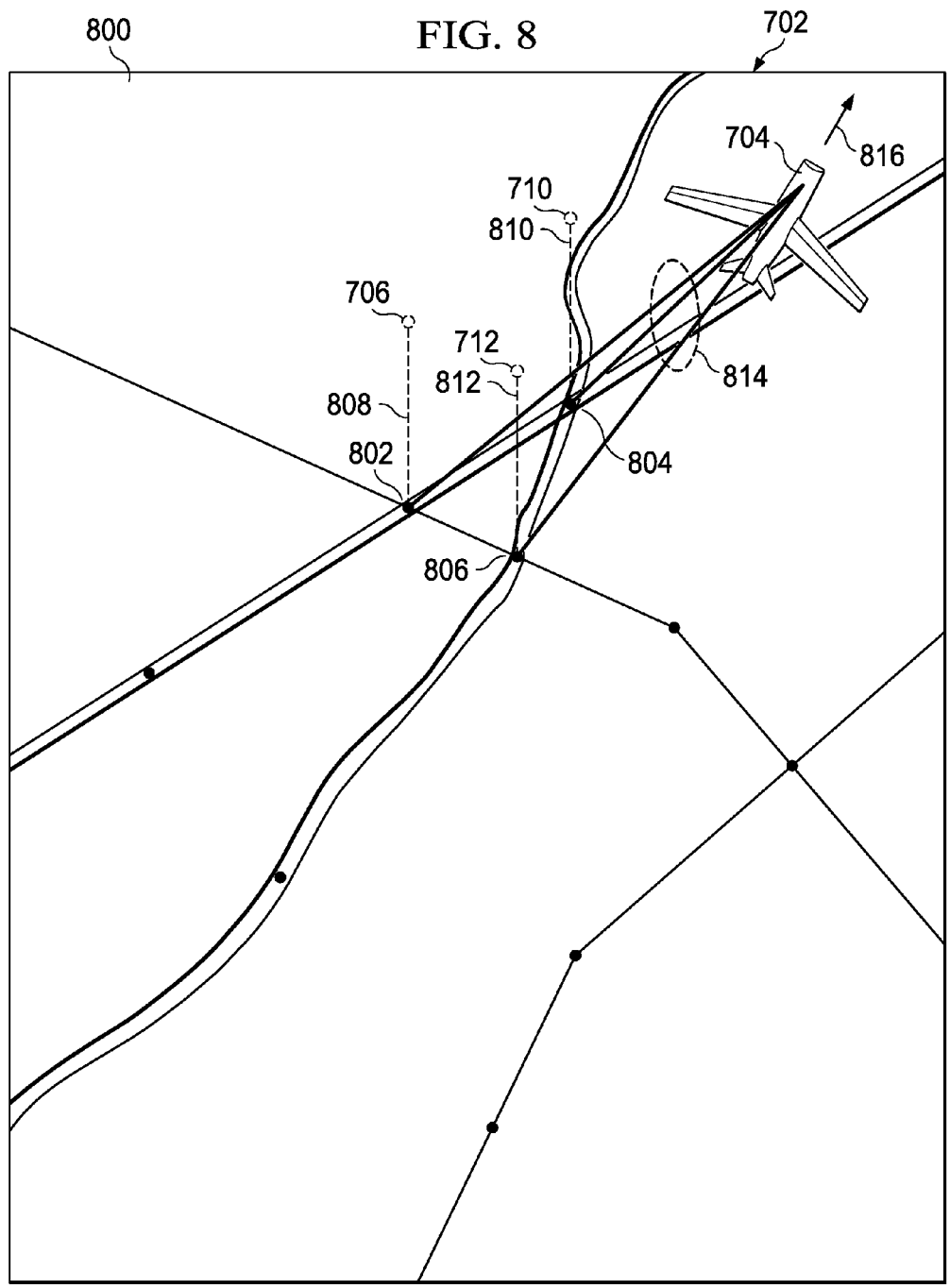
FIG. 8 is an illustration of an image obtained by a camera system on an aircraft in a second position in accordance with an advantageous embodiment.

Turning to FIG. 8, an image obtained by the camera system on aircraft 704 of FIG. 7 in a second position is depicted in accordance with an advantageous embodiment. In this example, image 800 is an example of images 140 in FIG. 1 or of images 202 in FIG. 2. Positions of features in image 800 are defined with respect to the same image frame 702 as in FIG. 7. For example, positions of features in image 800 may be defined with reference to pixel locations in image frame 702.

In this example, image 800 is a current image, whereas image 700 in FIG. 7 is a prior image from the previous frame in a series of images. In this example, the movement of features between images 700 and 800 is exaggerated for ease of illustration. In image 800, points 802, 804, and 806 correspond to the same features as points 706, 710, and 712 in image 700 in FIG. 7.

The locations of points 706, 710, and 712 in image frame 702 are shown as dashed circles in FIG. 8. Dashed lines 808, 810, and 812 represent the shift in the position in image frame 702 of the features corresponding to points 706 and 802, 710 and 804, and 712 and 806, respectively. Lines 814 are drawn between aircraft 704 and selected points 802, 804, and 806 in image 800. The angles of lines 814 with respect to aircraft 704 reflect and represent the perspective of the camera system on aircraft 704 in the second position.

The differences between lines 720 in FIG. 7 and lines 814 in FIG. 8 illustrate the shift in perspective of the camera system between images. In accordance with an advantageous embodiment, this shift in perspective of the camera system may be identified from the shift in the position of the features in image frame 702 represented by dashed lines 808, 810, and 812. The corresponding change in the position of aircraft 704 may be identified from the change in the perspective of the camera system. In this example, the identified change in the perspective of the camera system indicates that aircraft 704 has moved from the first position in the direction indicated by arrow 816 and is banking to the right.

Figure 9:
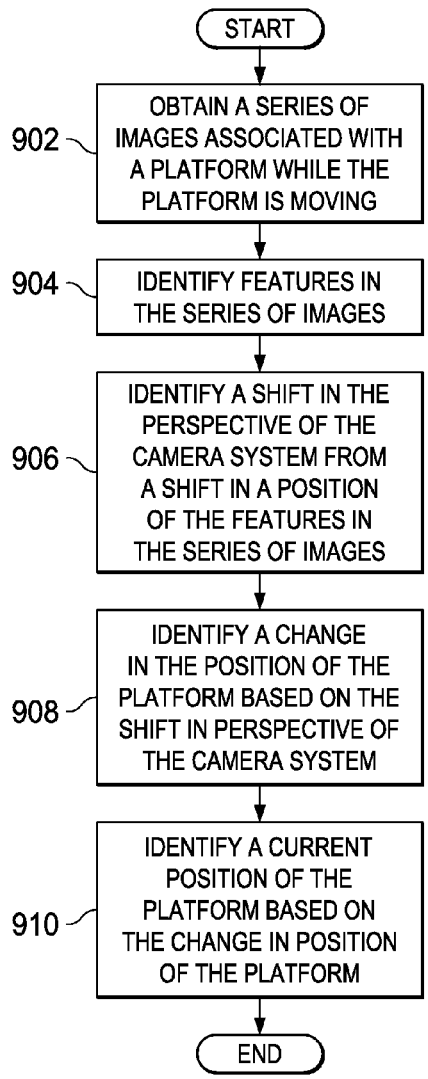
FIG. 9 is an illustration of a flowchart of a process for identifying a position of a platform in accordance with an advantageous embodiment.

Turning to FIG. 9, a flowchart of a process for identifying a position of a platform is depicted in accordance with an advantageous embodiment. The process in FIG. 9 may be performed, for example, by position identifier 130 in FIG. 1.

The process begins by obtaining a series of images associated with a platform while the platform is moving (operation 902). For example, the series of images may be generated by a camera system associated with the platform while the platform is moving within an environment. The environment may be an open environment or an enclosed environment.

Features in the series of images are identified (operation 904). These features may be features in the environment. A shift in the perspective of the camera system is identified from a shift in a position of the features in the series of images (operation 906).

A change in the position of the platform is identified based on the shift in the perspective of the camera system (operation 908). A current position of the platform may then be identified based on the identified change in the position of the platform (operation 910), with the process terminating thereafter. In operation 910, the current position of the platform may be identified based on the identified change in the position of the platform and a starting position of the platform.

Figure 10:
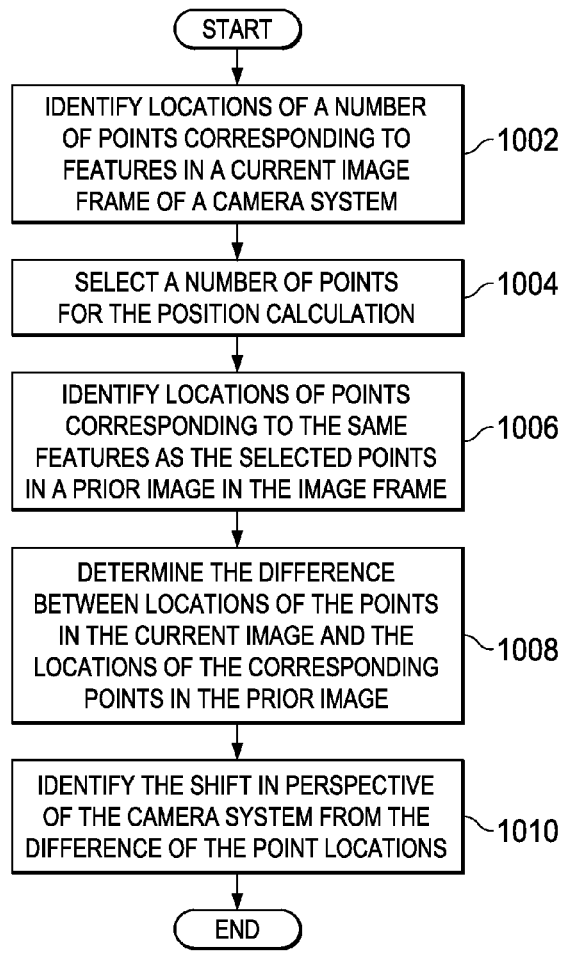
FIG. 10 is an illustration of a flowchart of a process for identifying a shift in a perspective of a camera system in accordance with an advantageous embodiment.

Turning to FIG. 10, a flowchart of a process for identifying a shift in a perspective of a camera system is depicted in accordance with an advantageous embodiment. In this example, the process in FIG. 10 is one example of a process for performing operation 906 in FIG. 9.

The process begins by identifying the locations of a number of points corresponding to features in a current image in an image frame of a camera system (operation 1002). A number of the points are selected for the position calculation (operation 1004). In operation 1004, at least three points may be selected for the position calculation.

Locations of points corresponding to the same features as the selected points are identified in a prior image in the image frame (operation 1006). The difference between the locations of the points in the current image and the locations of the corresponding points in the prior image is determined (operation 1008). Operation 1008 thus determines the shift in position of the features between the prior image and the current image. The shift in the perspective of the camera system is then identified from the differences of the locations for the points corresponding to the same features in the image frame between the current image and the prior image (operation 1010), with the process terminating thereafter.

One or more of the advantageous embodiments thus provide a capability to accurately and rapidly determine the location and orientation of a mobile platform using machine vision methods. In accordance with an advantageous embodiment, the position of the platform is determined from a shift in position of features in a series of images generated by a camera system associated with the mobile platform. A system in accordance with an advantageous embodiment may be mounted onto an aircraft and used to track the position of the aircraft without relying on global positioning system data, inertial or acceleration measurements, or magnetometers. However, the position of the aircraft as determined in accordance with advantageous embodiments may be combined with other position measurements to increase reliability.

Turning now to FIG. 11, an illustration of a data processing system is depicted in accordance with an advantageous embodiment. In this example, data processing system 1100 is an example of a system that may be used to implement the functions of position calculator 138 in FIG. 1 or position calculator 200 in FIG. 2. In this advantageous example, data processing system 1100 includes communications fabric 1102. Communications fabric 1102 provides communications between processor unit 1104, memory 1106, persistent storage 1108, communications unit 1110, input/output (I/O) unit 1112, and display 1114.

Processor unit 1104 serves to execute instructions for software that may be loaded into memory 1106. Processor unit 1104 may be a number of processors, a multi-processor core, or some other type of processor, depending on the particular implementation. Further, processor unit 1104 may be implemented using a number of heterogeneous processor systems in which a main processor is present with secondary processors on a single chip. As another advantageous example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, or other suitable information or any combination of information either on a temporary basis or a permanent basis or both. Storage devices 1116 may also be referred to as computer readable storage devices in these examples. Memory 1106, in these examples, may be, for example, a random access memory or any other suitable volatile or nonvolatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, or some other suitable input device or combination of devices.

Further, input/output unit 1112 may send output to a printer. Display 1114 provides a mechanism to display information to a user.

Instructions for the operating system, applications, or programs may be located in storage devices 1116, which are in communication with processor unit 1104 through communications fabric 1102. In these advantageous examples, the instructions are in a functional form on persistent storage 1108. These instructions may be loaded into memory 1106 for execution by processor unit 1104. The processes of the different embodiments may be performed by processor unit 1104 using computer implemented instructions, which may be located in a memory, such as memory 1106.

These instructions are referred to as program instructions, program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126. Computer readable storage media 1124 may include, for example, an optical or magnetic disk that is inserted or placed into a drive or other device that is part of persistent storage 1108 for transfer onto a storage device, such as a hard drive, that is part of persistent storage 1108.

Computer readable storage media 1124 also may take the form of a persistent storage, such as a hard drive, a thumb drive, or a flash memory, that is connected to data processing system 1100. In some instances, computer readable storage media 1124 may not be removable from data processing system 1100. In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, or any other suitable type of signal or combination of signals. These signals may be transmitted over communications links, such as wireless communications links, optical fiber cable, coaxial cable, a wire, or any other suitable type of communications link or combination of links. In other words, the communications link or the connection may be physical or wireless in the illustrative examples.

In some advantageous embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different advantageous embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code. As one example, data processing system 1100 may include organic components integrated with inorganic components or may be comprised entirely of organic components excluding a human being. For example, a storage device may be comprised of an organic semiconductor.

In another advantageous example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1118 may be omitted, because the processes for the different embodiments are implemented in a hardware unit.

In still another advantageous example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system.

Additionally, communications unit 1110 may include a number of devices that transmit data, receive data, or transmit and receive data. Communications unit 1110 may be, for example, a modem or a network adapter, two network adapters, or some combination thereof. Further, a memory may be, for example, memory 1106, or a cache, such as found in an interface and memory controller hub that may be present in communications fabric 1102.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

The description of the different advantageous embodiments has been presented for purposes of illustration and description and is not intended to be exhaustive or to limit the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying a position of a platform comprising:
   identifying a first location of a feature in a first image in a series of images generated by a camera system on the platform while the platform is moving;
   identifying a second location of the feature in a second image in the series of images generated by the camera system on the platform while the platform is moving, wherein the second image is taken at a different time from the first image;
   determining whether the feature is moving in an environment in a field of view of the camera system; and
   identifying a difference between the first location of the feature in the first image and the second location of the feature in the second image, identifying a shift in a perspective of the camera system from the difference between the first location of the feature in the first image in the series of images and the second location of the feature in the second image in the series of images, and identifying a change in the position of the platform based on the shift in the perspective in response to a determination that the feature is not moving in the environment in the field of view of the camera system.

2. The method of claim 1 further comprising identifying a current position of the platform based on the change in the position of the platform.

3. The method of claim 2 further comprising controlling movement of the platform based on the current position of the platform.

4. The method of claim 1, wherein the position of the platform comprises a location of the platform in a three-dimensional coordinate system and an orientation of the platform in the three-dimensional coordinate system.

5. The method of claim 1, wherein:
   identifying the first location of the feature in the first image comprises identifying a first number of pixels in the first image corresponding to the feature in the environment in the field of view of the camera system; and
   identifying the second location of the feature in the second image comprises identifying a second number of pixels in the second image corresponding to the feature in the environment in the field of view of the camera system.

6. The method of claim 1, wherein:
   identifying the first location of the feature in the first image in the series of images comprises receiving a current one of the series of images from the camera system and identifying a plurality of first locations in an image frame of the camera system, wherein each of the plurality of first locations corresponds to the feature in the current one of the series of images; and
   identifying the second location of the feature in the second image in the series of images comprises identifying a plurality of second locations in the image frame, wherein each of the plurality of second locations corresponds to the feature in a prior one of the series of images.

7. The method of claim 6, wherein identifying the shift in the perspective of the camera system comprises:
   selecting selected ones of the first locations corresponding to selected portions of the feature;
   identifying selected ones of the second locations corresponding to same selected portions of the feature as the selected ones of the first locations; and
   identifying the shift in the perspective of the camera system from a difference between the selected ones of the first locations in the image frame and the selected ones of the second locations in the image frame.

8. The method of claim 1, wherein the platform is a robotic manipulator and the camera system is attached to the robotic manipulator.

9. A method for identifying a position of an aircraft, comprising:
   identifying a first location of a feature in a first image in a series of images generated by a camera system on the aircraft while the aircraft is moving;
   identifying a second location of the feature in a second image in the series of images generated by the camera system on the aircraft while the aircraft is moving, wherein the second image is taken at a different time from the first image;
   determining whether the feature is moving in an environment in a field of view of the camera system; and
   identifying a difference between the first location of the feature in the first image and the second location of the feature in the second image, identifying a shift in a perspective of the camera system from the difference between the first location of the feature in the first image in the series of images and the second location of the feature in the second image in the series of images, and identifying a change in the position of the aircraft based on the shift in the perspective in response to a determination that the feature is not moving in the environment in the field of view of the camera system.

10. The method of claim 9 further comprising identifying a current position of the aircraft based on the change in the position of the aircraft.

11. The method of claim 10 further comprising controlling movement of the aircraft based on the current position of the aircraft.

12. The method of claim 9, wherein the position of the aircraft comprises a location of the aircraft and an attitude of the aircraft.

13. The method of claim 12, wherein the location of the aircraft comprises geographic coordinates and an altitude of the aircraft.

14. The method of claim 9, wherein:
identifying the first location of the feature in the first image comprises identifying a first group of pixels in the first image corresponding to the feature in the environment in the field of view of the camera system; and
identifying the second location of the feature in the second image comprises identifying a second group of pixels in the second image corresponding to the feature in the environment in the field of view of the camera system.

15. The method of claim 14, wherein the environment is selected from one of an open environment in which the aircraft is moving and an enclosed environment in which the aircraft is moving.

16. The method of claim 9, wherein:
identifying the first location of the feature in the first image in the series of images comprises receiving a current one of the series of images from the camera system and identifying a plurality of first locations in an image frame of the camera system, wherein each of the plurality of first locations corresponds to the feature in the current one of the series of images; and
identifying the second location of the feature in the second image in the series of images comprises identifying a plurality of second locations in the image frame, wherein each of the plurality of second locations corresponds to the feature in a prior one of the series of images.

17. The method of claim 16, wherein identifying the shift in the perspective of the camera system comprises:
selecting selected ones of the first locations corresponding to selected portions of the feature;
identifying selected ones of the second locations corresponding to same selected portions of the feature as the selected ones of the first locations; and
identifying the shift in the perspective of the camera system from a difference between the first locations in the image frame and the second locations in the image frame.

18. An apparatus comprising:
a camera system configured to generate a series of images and located on a platform; and
a position calculator configured to identify a first location of a feature in a first image in the series of images generated by the camera system on the platform while the platform is moving; identify a second location of the feature in a second image in the series of images generated by the camera system on the platform while the platform is moving, wherein the second image is taken at a different time from the first image; determine whether the feature is moving in an environment in a field of view of the camera system; and identify a difference between the first location of the feature in the first image and the second location of the feature in the second image, identify a shift in a perspective of the camera system from the difference between the first location of the feature in the first image in the series of images and the second location of the feature in the second image in the series of images, and identify a change in a position of the platform based on the shift in the perspective in response to a determination that the feature is not moving in the environment in the field of view of the camera system.

19. The apparatus of claim 18, wherein the position calculator is further configured to identify a current position of the platform based on the change in the position of the platform.

20. The apparatus of claim 18, wherein the position of the platform comprises a location of the platform in a three-dimensional coordinate system and an orientation of the platform in the three-dimensional coordinate system.

21. The apparatus of claim 18, wherein the position calculator is configured to:
identify a first group of pixels in the first image corresponding to the feature in the environment in the field of view of the camera system; and
identify a second group of pixels in the second image corresponding to the feature in the environment in the field of view of the camera system.

22. The apparatus of claim 18, wherein the position calculator is configured to:
receive a current one of the series of images from the camera system;
identify a plurality of first locations in an image frame of the camera system, wherein each of the plurality of first locations corresponds to the feature in the current one of the series of images; and
identify a plurality of second locations in the image frame, wherein each of the plurality of second locations corresponds to the feature in a prior one of the series of images.

23. The apparatus of claim 22, wherein the position calculator is configured to:
select selected ones of the first locations corresponding to selected portions of the feature;
identify selected ones of the second locations corresponding to same selected portions of the feature as the selected ones of the first locations; and
identify the shift in the perspective of the camera system from a difference between the first locations in the image frame and the second locations in the image frame.

24. The apparatus of claim 18 further comprising:
a housing, wherein the camera system and the position calculator are contained in the housing; and
a mounting structure configured to attach the housing to the platform.

25. The apparatus of claim 24, wherein the mounting structure is configured to attach the housing to the platform, wherein the platform is selected from the group of platforms consisting of an aircraft and a robotic manipulator.

26. The apparatus of claim 18, wherein the camera system comprises a camera having a frame rate of at least approximately one hundred frames per second.

\* \* \* \* \*